US008364852B1

(12) United States Patent
Shukla et al.

(10) Patent No.: US 8,364,852 B1
(45) Date of Patent: Jan. 29, 2013

(54) METHODS AND APPARATUS TO GENERATE AND UPDATE FIBRE CHANNEL FIREWALL FILTER RULES USING ADDRESS PREFIXES

(75) Inventors: Amit Shukla, Sunnyvale, CA (US); Srinivasan Jagannadhan, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 12/976,085

(22) Filed: Dec. 22, 2010

(51) Int. Cl.
*G06F 3/00* (2006.01)

(52) U.S. Cl. .................... 710/3; 726/11; 726/27

(58) Field of Classification Search ......... 710/3; 726/11
See application file for complete search history.

(56) References Cited

U.S. PATENT DOCUMENTS

| | | | |
|---|---|---|---|
| 6,625,673 B1 | 9/2003 | Dickey et al. | |
| 6,950,871 B1 | 9/2005 | Honma et al. | |
| 7,774,445 B1* | 8/2010 | Weinbrecht et al. | 709/223 |
| 7,889,674 B2* | 2/2011 | Park et al. | 370/254 |
| 2002/0196773 A1 | 12/2002 | Berman | |
| 2003/0179748 A1* | 9/2003 | George et al. | 370/389 |
| 2003/0195956 A1* | 10/2003 | Bramhall et al. | 709/223 |
| 2005/0091353 A1* | 4/2005 | Gopisetty et al. | 709/223 |
| 2006/0075480 A1 | 4/2006 | Noehring et al. | |
| 2006/0190611 A1* | 8/2006 | Miyazaki et al. | 709/229 |
| 2008/0247405 A1* | 10/2008 | O'Leary et al. | 370/401 |
| 2008/0282335 A1 | 11/2008 | Abzarian et al. | |
| 2009/0164630 A1* | 6/2009 | Hirata et al. | 709/225 |
| 2009/0276526 A1 | 11/2009 | Carlson et al. | |

OTHER PUBLICATIONS

Wikipedia, Classless Inter-Domain Routing, [Online] [retrieved Sep. 8, 2010] Retrieved from the Internet: <URL: http://en.wikipedia.org/wiki/Classless_Inter-Domain_Routing> (3 pages).

Juniper Networks, "Firewall Filters for EX Series Switches Overview" [Online] Retrieved from the Internet: <URL: http://www.juniper.net/techpubs/en_US/junos10.3/topics/concept/fir...>, published Jun. 22, 2010 (1 page).

Juniper Networks, "New Features in JUNOS Release 10.0 for EX Series Switches" [Online] Retrieved from the Internet: <URL: http://jnpr.net/techpubs/en_US/junos10.0/information-products/topic-...>, published Jun. 22, 2010 (2 pages).

(Continued)

*Primary Examiner* — Elias Mamo
(74) *Attorney, Agent, or Firm* — Cooley LLP

(57) ABSTRACT

In one embodiment, a network management module converts zone policies for a network into access sets and access set lists. The network management module can define access sets for a collection of peripheral processing devices that share the same communication restrictions imposed by the zone policies. The network management module can allocate address blocks for each access set such that at least some of the peripheral processing devices in the same access can share a common address prefix. The network management module can define access sets lists such that each access set references an access set list that includes all the peripheral processing devices in the network that can communicate with the peripheral processing devices in the referencing access set. The network management module can apply access sets and access set lists in generating or updating firewall filter rules, and in some embodiments, the access sets can be expressed in terms of the one or more common address prefixes. The conversion of zone policies into access sets and access set lists can, for example, improve the efficiency of zone policy conversion and the optimal state of the firewall filter rules, which can result in reduced disruptions from logins or logouts of peripheral processing devices, and/or faster responses to post-login queries by newly-connected peripheral processing devices concerning the restrictions on its communications.

20 Claims, 8 Drawing Sheets

OTHER PUBLICATIONS

Charlie Schluting, "Storage Basics: Understanding Fibre Channel Zones" [Online] Retrieved from the Internet: <URL: http://www.enterprisestorageforum.com/sans/features/article.php/37...>, Nov. 9, 2007, (2 pages).

Wikipedia, "Fibre Channel zoning"[Online] [retrieved Sep. 2, 2010] Retrieved from the Internet: <URL: http://en.wikipedia.org/wiki/Fibre_Channel_zoning> (2 pages).

Storage Networking Industry Association, "Managing a Fibre Channel Storage Area Network" Storage Network Management Working Group for Fibre Channel (SNMWG-FC) Nov. 20, 1998 (12 pages).

Cisco Systems, Inc. "Zone-Based Policy Firewall Design and Application Guide" Document ID: 98628, Updated: Sep. 13, 2007 (49 pages).

Kireeti Kompella et al. "LSP Hierarchy with Generalized MPLS TE" Juniper Networks, Network Working Group, Internet Draft, draft-ietf-mpls-lsp-hierarchy-08.txt, Mar. 2002 (13 pages).

Brass Tacks, "PT2PT and VN2VN—Directly connecting an FCoE initiator to an FCoE target (Part 1—Overview)" [Online] Retrieved from the Internet: <URL: http://www.brasstacksblog.typepad.com/brass-tacks/2011/03/pt2pt-and-v...>, Nov. 9, 2007, posted Mar. 8, 2011 (5 pages).

John L. Hufferd et al. "The Missing Piece (FCoE Data Transfer End to End *with* FCF assistance)" T11/10-339v1, Aug. 4, 2010 (15 pages).

Claudio DeSanti et al. Locally Unique N_Port_IDs, T11/10-019v2, Jan. 2010 (12 pages).

Claudio DeSanti et al. "VN2VN Multi-Point and Point-to-Point" T11/10-156v0, Mar. 2010 (32 pages).

Office Action for U.S. Appl. No. 12/976,105, mailed Dec. 21, 2011.

Final Office Action for U.S. Appl. No. 12/976,105, mailed Jul. 19, 2012.

U.S. Appl. No. 12/976,200, filed Dec. 22, 2010, entitled Apparatus and Methods to Aggregate FCOE (Fibre Channel Over Ethernet) Filter Rules of a Single Interface in a Single or Few Rules on a First-Hop FCOE Networking Element.

U.S. Appl. No. 12/976,096, filed Dec. 22, 2010, entitled Methods and Apparatus for Redundancy Associated With a Fibre Channel Over Ethernet Network.

U.S. Appl. No. 12/976,208, filed Dec. 22, 2010, entitled Methods and Apparatus to Reduce Forwarding State on an FCOE-TO-FC Gateway Using Port-Specific MAC Addresses.

U.S. Appl. No. 12/976,212, filed Dec. 22, 2010, entitled Methods and Apparatus to Route Fibre Channel Frames Using Reduced Forwarding State on an FCOE-TO-FC Gateway.

U.S. Appl. No. 12/976,222, filed Dec. 22, 2010, entitled Methods and Apparatus for Providing Unique Mac Address to Individual Node for Fibre Channel Over Ethernet (FCOE) Traffic.

U.S. Appl. No. 13/324,424, filed Dec. 13, 2011, entitled Methods and Apparatus for Implementing a Fibre Channel Zone Policy.

* cited by examiner

Access Set Table 300

| Access Set 310 | Members 320 | Access Set List(s) Referenced 330 |
|---|---|---|
| $AS_1$ | $PPD_1$ | $ASL_1$ |
| $AS_2$ | $PPD_2$ | $ASL_2$ |
| $AS_3$ | $PPD_3$ $PPD_4$ | $ASL_3$ |
| $AS_4$ | $PPD_5$ | |
| $AS_5$ | $PPD_6$ | $ASL_4$ |
| $AS_6$ | $PPD_7$ | $ASL_5$ |
| $AS_7$ | $PPD_8$ | $ASL_6$ |

$ASL_1=\{AS_1, AS_2\}$
$ASL_2=\{AS_1, AS_2, AS_3, AS_4\}$
$ASL_3=\{AS_2, AS_3, AS_4\}$
$ASL_4=\{AS_5, AS_6\}$
$ASL_5=\{AS_5, AS_6, AS_7\}$
$ASL_6=\{AS_6, AS_7\}$

| Compressed Access Set Table 500 | | |
|---|---|---|
| Access Set 510 | Members 520 | Access Set List(s) Referenced 530 |
| $AS_1$ | $PPD_1$ | $ASL_{1'}$ |
| $AS_2$ | $PPD_2$ | $ASL_{2'}$ |
| $AS_{3'}$ (from $AS_3$ and $AS_4$) | $PPD_3$ $PPD_4$ $PPD_5$ | $ASL_{1'}$ |
| $R-AS_5$ (from $AS_5$ and $AS_7$) | $PPD_6$ $PPD_8$ | $ASL_{4'}$ |
| $AS_6$ | $PPD_7$ | $ASL_{3'}$ |
$ASL_{1'} = \{AS_2\}$
$ASL_{2'} = \{AS_1, AS_3, AS_4\} = \{AS_1, AS_{3'}\}$
$ASL_{3'} = \{AS_5, AS_7\} = \{R-AS_5\}$
$ASL_{4'} = \{AS_6\}$
FIG. 5
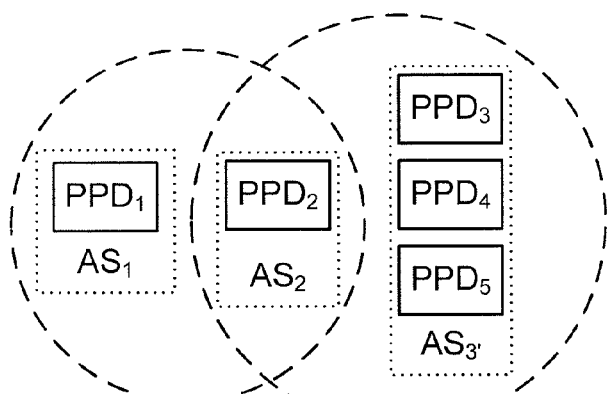
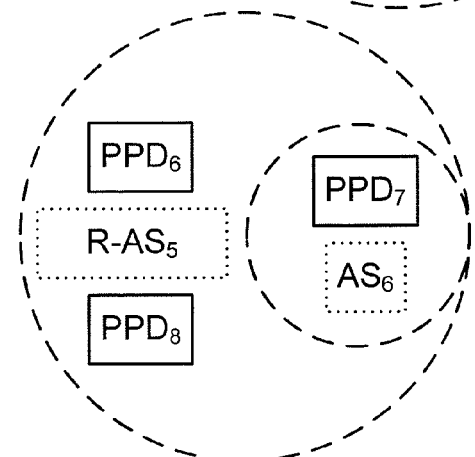
FIG. 6

METHODS AND APPARATUS TO GENERATE AND UPDATE FIBRE CHANNEL FIREWALL FILTER RULES USING ADDRESS PREFIXES

TECHNICAL FIELD

The communication or transmission of data between two or more peripheral processing devices in a network is described. More particularly, some embodiments described herein relate to network management methods and apparatus converting zone policies into firewall filter rules.

BACKGROUND

To facilitate the management of Fibre Channel networks, an administrator may specify a zone policy defining Fibre Channel zones to restrict one or more subsets of peripheral processing devices in the network only to communicate within each subset. Such zone policies, however, are typically converted into firewall filter rules to enforce restrictions on communications outside of the network zones. The firewall filter rules are typically stored in network routers or switches using very limited ternary content addressable memory (TCAM).

In addition, in known Fibre Channel networks, each time a peripheral processing device logs into or out of a Fibre Channel network, the firewall filter rules affecting that peripheral processing device are typically generated or updated. In some TCAM-based implementations, the login of a new peripheral processing device can add to the number of firewall filter rules, or increase the length of some firewall filter rules, or a combination of both. Such generation or updating of the firewall filter rules typically involves a delay after a login or logout event by any peripheral processing device, and may disrupt subsequent network traffic. Immediately after logging into a Fibre Channel network, a newly-connected peripheral processing device typically queries the Fibre Channel network to determine with which other peripheral processing devices the newly-connected peripheral processing device is permitted to communicate. The response time to such a post-login query by a newly-connected peripheral processing device can depend on the structure or complexity of the entire set of the firewall filter rules in effect across the entire Fibre Channel network.

Thus, a need exists for methods and apparatus to compress the filter rules defined for logged-in devices, and reduce the disruption caused by login or logout events of peripheral processing devices from a Fibre Channel network.

SUMMARY

In one embodiment, a network management module converts zone policies for a network into access sets and access set lists. The network management module can define access sets for a collection of peripheral processing devices that share the same communication restrictions imposed by the zone policies. The network management module can allocate address blocks for each access set such, that at least some of the peripheral processing devices in the same access can share a common address prefix. The network management module can define access sets lists such that each access set references an access set list that includes all the peripheral processing devices in the network that can communicate with the peripheral processing devices in the referencing access set. The network management module can apply access sets and access set lists in generating or updating firewall filter rules, and in some embodiments, the access sets can be expressed in terms of the one or more common address prefixes. The conversion of zone policies into access sets and access set lists can, for example, improve the efficiency of zone policy conversion and the optimal state of the firewall filter rules, which can result in reduced disruptions from logins or logouts of peripheral processing devices, and/or faster responses to post-login queries by newly-connected peripheral processing devices concerning possible restrictions on its communications.

BRIEF DESCRIPTION OF THE DRAWINGS

FIG. 5 is an illustrative example of compressing access sets and access set lists from the definition of access sets and access set lists defined in FIG. 3.

FIG. 6 is a logical representation of compressed access sets and restricted access sets according to the definitions from the example in FIG. 5.

DETAILED DESCRIPTION

Figure 1:
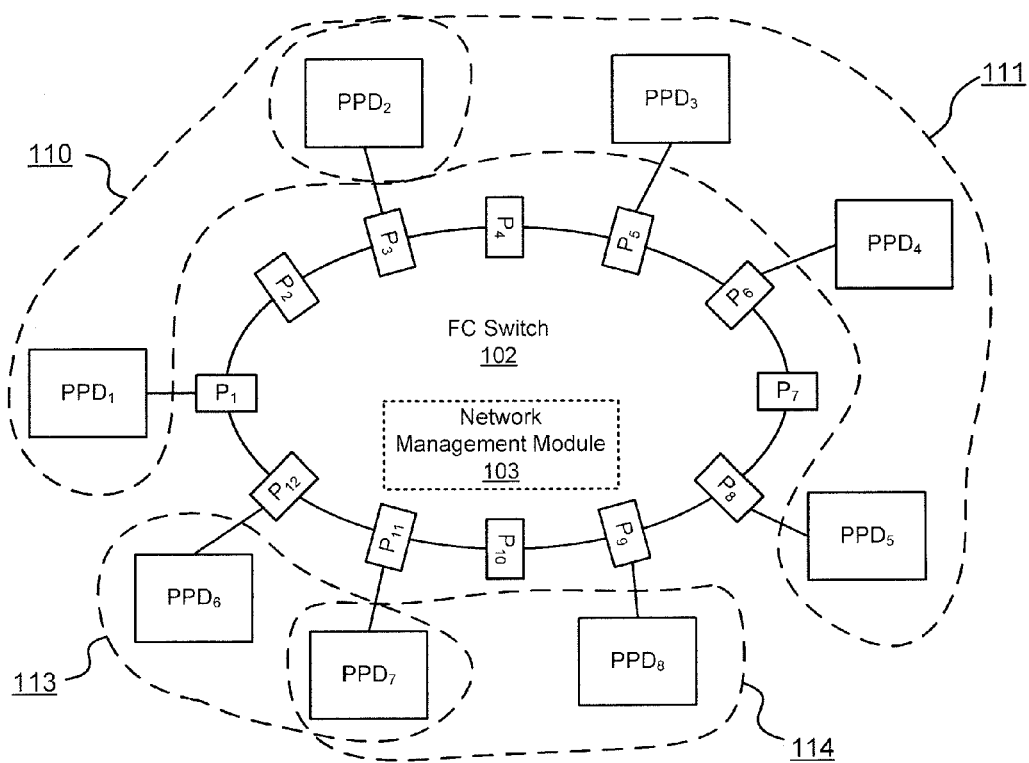
FIG. 1 is a system block diagram of a Fibre Channel network, according to one embodiment.

To facilitate the management of a network, a network administrator can specify a zone-server policy defining partitions in the network, referred to as zone assignments or zones. As a result, the communication traffic is subjected to policy restrictions as it crosses outside each zone to another area of the network. A first peripheral processing device in a zone shares the same policy restrictions as a second peripheral processing device in the same zone as the first peripheral processing device. One example of such policy restrictions is to block all communication traffic moving between zones while allowing all communication traffic within a zone, such that a first peripheral processing device can communicate with a second peripheral processing device with which the first peripheral processing device shares a zone but not any other peripheral processing devices outside of the zone.

In use, an administrator can choose to define at least two network zones, for example to isolate one area of the network from the other. In some embodiments, for example, a network can have thousands of network zones. Network zones can be defined by referring to the switch ports, the world wide names (WWNs) of peripheral processing devices in the network, other addressing systems such as Fibre Channel ID (FCID), and/or any other suitable identification. After a network administrator specifies the zone policy for a network, a network management module in some embodiments can convert the zone policy into firewall filter rules to enforce the zone policy. To facilitate the conversion of the zone policy into firewall filter rules, access sets and access set lists can be used.

In some embodiments, a network management module can define access sets such that each access set is a subset of a network zone and represents a collection of peripheral processing devices in the network that have the same communication restrictions imposed by the zone policy. Because each access set is subset of a network zone, all of the peripheral processing devices in an access set can communicate with each other within the same access set. All of the access sets in a given network are disjointed, meaning that the access sets do not overlap so that a given peripheral processing device can be a member of a single access set. In some embodiments, a network management module can define access set lists such that each access set references an access set list that includes all the peripheral processing devices in the network that can communicate with the peripheral processing devices in the referencing access set.

Because access sets that refer to the same access set list share the same communication restrictions imposed by the zone policy, a network management module in some embodiments can simplify or compress the access sets by combining access sets that refer to the same access set list. In addition, because a given peripheral processing device can communicate with itself without accessing the network and the firewall filter rules do not need to provide for a peripheral processing device to communicate with itself, a network management module in some embodiments can simplify or compress the access sets by eliminating the access set in the access set list that is the same as the referencing access set. In other words, using a generic representation, if a given access set $AS_i$ references access set list $ASL_j$, where i and j are generic labels, and if access set list $ASL_j$ is defined to include access set $AS_i$ as a member, then in effect, the relationship of access set $AS_i$ referencing access set list $ASL_j$ includes the self-referencing of access set $AS_i$ and such self-referencing can be eliminated.

A network management module can further simplify or compress access sets and access set lists, or compressed, by introducing restricted access sets such that by definition, a peripheral processing device in a restricted access set can communicate with the peripheral processing devices in the access set list that the restricted access set references but not with other peripheral processing devices. Thus, a peripheral processing device in a restricted access set are restricted from communicating with any other peripheral processing devices in the same restricted access set, but the peripheral processing devices in the same restricted access set still share the same communication restrictions imposed by the zone policy. A network management module can then combine into one restricted access set, those access sets each containing a single peripheral processing device and referring to the same access set list.

Typically, a firewall filter rule can include one or more Source ID List(s), one or more Destination ID List(s), and a specified communications restrictions. In some embodiments, the specified communications restrictions can include "allow" or "deny". A Source ID List can also be referred to as a sid-list, and a Destination ID List can also be referred to as a did-list. By representing zone policies in terms of access sets and access set lists, a network management module in some embodiments can convert zone policies into firewall filter rules by using access sets and access set lists. For example using a generic representation, if a given access set $AS_i$ references access set list $ASL_j$, where i and j are generic labels, then all of the peripheral processing devices contained in access set $AS_i$ can communicate with all of peripheral processing devices contained in access set list $ASL_j$. As such, all of the peripheral processing devices in a given access set $AS_i$ referencing access set list $ASL_j$, can share the same firewall filter rule with the sid-list, having peripheral processing devices represented by $AS_i$, and the did-list, having the peripheral processing devices represented by $ASL_j$.

In some embodiments using Fibre Channel switch fabrics, a network management module can allocate Fibre Channel IDs, also referred to as FCID addresses, to correspond to the zone policy of the network. More specifically, a network management module can assign or allocate FCID addresses represented by one or more address blocks to each access set, with each address block assignable to one access set. Because all the peripheral processing devices in an access set can share the same firewall filter rule, the firewall filter rules for such peripheral processing devices in the same access set can be combined into a single firewall filter rule with the sid-list specified by referring to the address block allocated to the access set.

FIG. 1 is a system block diagram of a Fibre Channel network, according to an embodiment. Fibre Channel switch 102 can be a single switch or a switched fabric with one or more stages as described in further detail herein. The Fibre Channel switch 102 has multiple switch ports labeled as $P_1$ through $P_{12}$. Ports $P_1$ through $P_{12}$ are communication interfaces that can couple to other switches, compute devices (as described in further detail herein in connection with FIG. 12), and/or peripheral processing devices. Fibre Channel switch 102 can send data from any of the ports from the set of ports $P_1$ through $P_{12}$ to any other ports from the set of ports $P_1$ through $P_{12}$. In some embodiments, Fibre Channel switch 102 can include one or more processors and one or more memory modules (not shown in FIG. 1), where the one or more processors are operatively coupled to the ports and the one or more memories.

Figure 12:
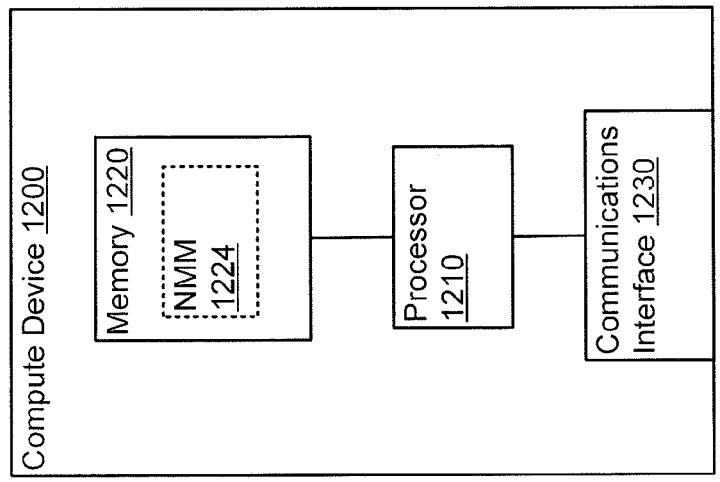
FIG. 12 is a system block diagram of a compute device of a switch fabric system, according to another embodiment.

Fibre Channel switch 102 further includes a network management module 103, which manages a configuration table associated with the Fibre Channel network. The network management module 103 can be a process, application, virtual machine, and/or some other software module (executing in hardware), a hardware module, or a combination thereof. In the embodiment illustrated in FIG. 1, the network management module 103 is hosted inside the Fibre Channel switch 102. In other embodiments, network management module can be hosted inside multiple Fibre Channel switches within a Fibre Channel network. FIG. 12 described in further detail herein illustrates another possible embodiment of a network management module (NMM) 1224 to be hosted inside a compute device 1200 and coupled to one or more Fibre Channel switches (not shown in FIG. 12) through communications interface 1230. Additional alternative embodiments of a network management module include hosting such a network management module inside one or more peripheral processing devices $PPD_1$ through $PPD_8$ and coupled to a Fibre Channel network through one or more of ports $P_1$ through $P_{12}$.

Network management module 103 can associate the ports of Fibre Channel switch 102, ports $P_1$ through $P_{12}$, or can associate the peripheral processing devices $PPD_1$ through $PPD_8$, with one or more zones. Network management module 103 can also apply zone policies to impose restrictions on communication traffic within each zone and as communication traffic crosses each zone to another area of the network. In one embodiment, network management module 103 can block all communication traffic moving between zones while allowing all communication traffic within a zone, such that a first peripheral processing device can communicate with a second peripheral processing device with which the first peripheral processing device shares a zone but not other peripheral processing devices outside the zone. A network management module 103 can enforce zone policies by converting zone policies into firewall filter rules.

Figure 9:
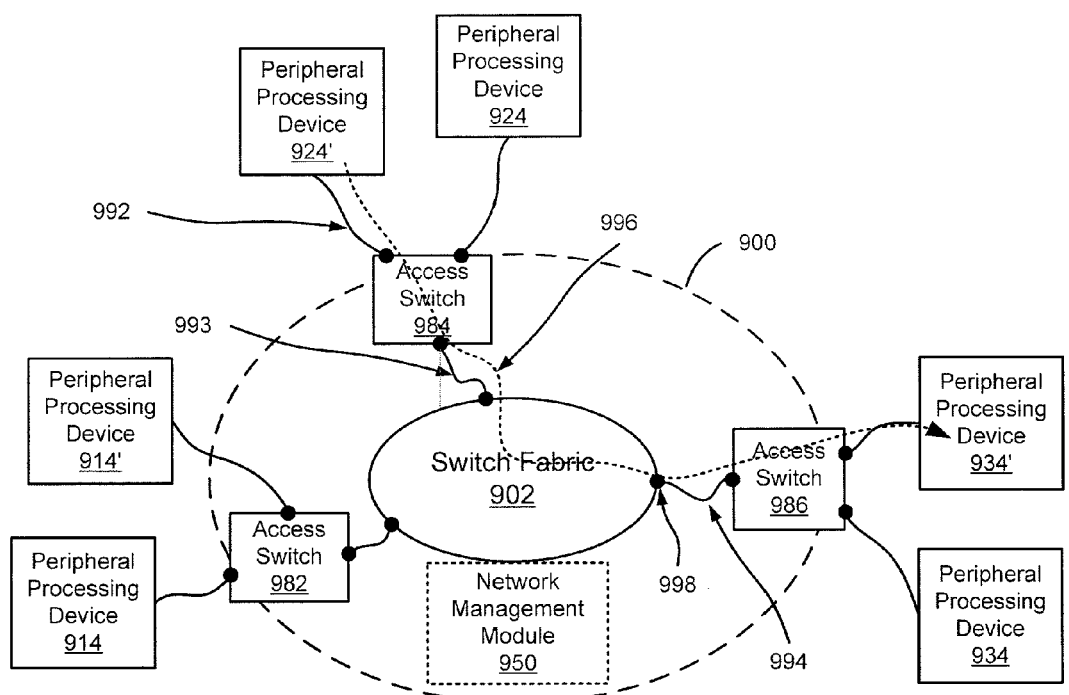
FIG. 9 is a system block diagram of a switch fabric system, according to an embodiment.
Figure 10:
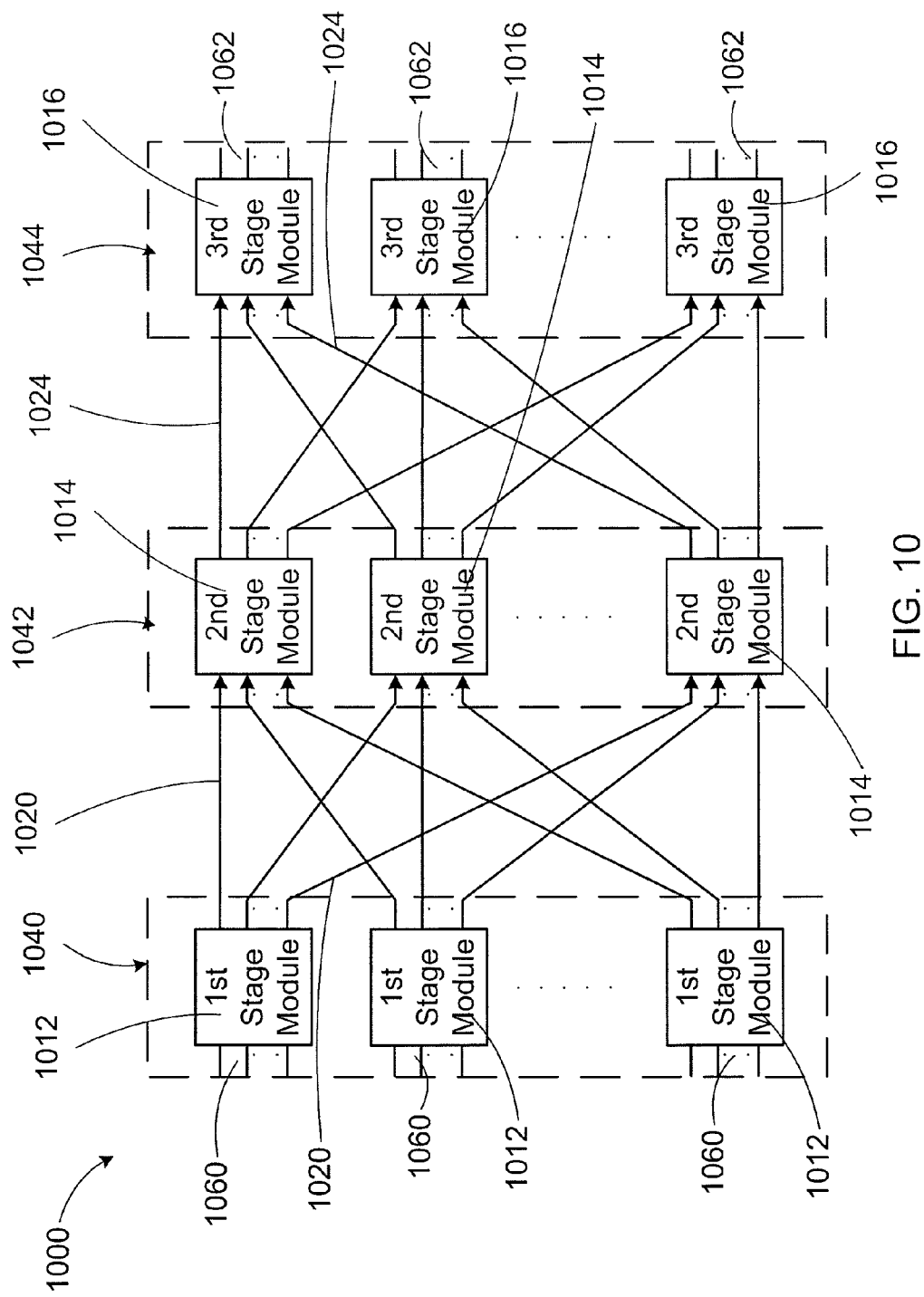
FIG. 10 is a schematic illustration of a switch fabric, according to another embodiment.

In some embodiments, the network management module 103 can forward the zone policy to all of the switches in the network, such as access switches 982, 984, 986, and switch modules 1012, 1014, 1016 illustrated in FIGS. 9-10 described in further detail herein. In such embodiments, all of the switches in the network, such as access switches 982, 984, 986, and switch modules 1012, 1014, 1016, can each convert the zone policy into firewall filter rules, and all of the switches in the network can enforce the firewall filter rules simultaneously.

Fibre Channel switch 102 is operatively coupled to multiple peripheral processing devices labeled as $PPD_1$ through $PPD_8$, which correspond to the respective World Wide Names (WWNs) of the peripheral processing devices. The peripheral processing devices $PPD_1$ through $PPD_8$ can include but are not limited to compute nodes, service nodes, routers, and storage nodes. In some embodiments, for example, the peripheral processing devices $PPD_1$ through $PPD_8$ can include servers, storage devices, gateways, and workstations.

Each peripheral processing device $PPD_1$ through $PPD_8$ is operatively coupled to Fibre Channel switch 102 through a separate switch port from the set of ports $P_1$ through $P_{12}$. For example, peripheral processing device $PPD_1$ is coupled to Fibre Channel switch 102 through port $P_1$, and peripheral processing device $PPD_2$ is coupled to Fibre Channel switch 102 through port $P_3$. The peripheral processing devices $PPD_1$ through $PPD_8$ can be coupled to switch ports $P_1$ through $P_{12}$ using any suitable connection such as, for example, an optical connection (e.g., an optical cable and optical connectors), an electrical connection (e.g., an electrical cable and electrical connectors) and/or the like. Although FIG. 1 illustrates an embodiment where each one of peripheral processing devices $PPD_1$ through $PPD_8$ is coupled to Fibre Channel switch 102 through a single port from the set of ports $P_1$ through $P_{12}$, in other embodiments a single peripheral processing device can be coupled to a network switch via a plurality of ports, for example through virtualization.

In the embodiment shown in FIG. 1, the dashed lines illustrate the zones of a network that an administrator can specify. The zones can be defined by referring to the switch ports $P_1$ through $P_{12}$, by the WWNs of the peripheral processing devices $PPD_1$ through $PPD_8$, or by both the WWNs and the switch port identifiers. For example, zone 110 can be defined by the WWNs of peripheral processing devices $PPD_1$ and $PPD_2$, and $PPD_1$ and $PPD_2$ can be coupled to switch 102 through any switch ports to be part of zone 110. In other arrangements, zone 110 is defined by the switch ports $P_1$ and $P_3$, and any peripheral processing devices $PPD_1$ through $PPD_8$ that are coupled to switch 102 through $P_1$ and $P_3$ are part of zone 110. In contrast, if Although FIGS. 1-7 are described in the context of zoning being defined by the WWNs, it should be understood that other zoning definitions are possible.

Figure 2:
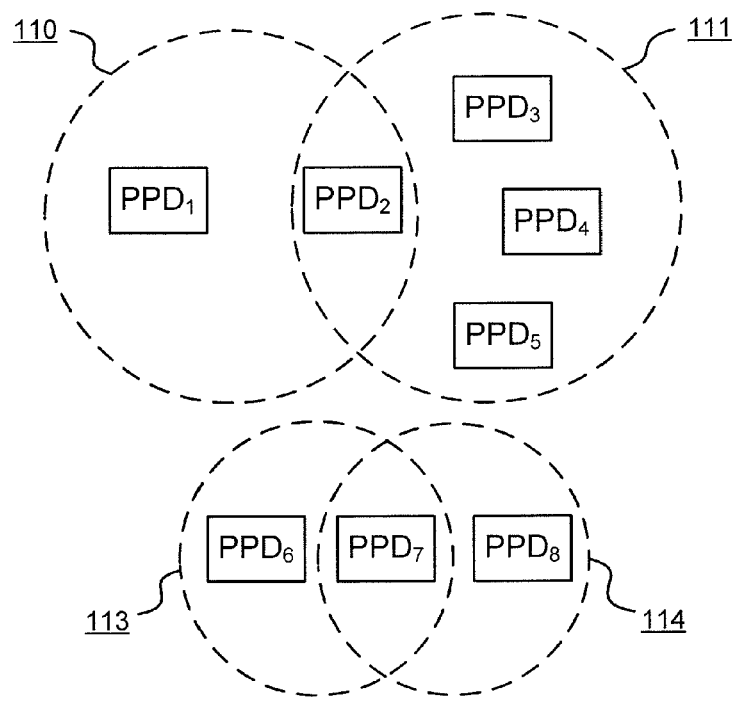
FIG. 2 is a logical representation of the zones in the Fibre Channel network of FIG. 1.

FIG. 2 illustrates the logical relationships among the peripheral processing devices $PPD_1$ through $PPD_8$ in the zones defined in FIG. 1. Zone 110 includes peripheral processing devices $PPD_1$ and $PPD_2$. Similarly, zone 111 includes peripheral processing devices $PPD_2$, $PPD_3$, $PPD_4$ and $PPD_5$; zone 113 includes peripheral processing devices $PPD_6$ and $PPD_7$; and, zone 114 includes peripheral processing devices $PPD_7$ and $PPD_8$. As demonstrated in the logical relationships illustrated in FIG. 2, a peripheral processing device can be a member of multiple zones.

Assuming a policy restriction that blocks all traffic moving between zones while allowing all traffic within a zone, the zoning in FIGS. 1-2 provides, for example, that peripheral processing device $PPD_1$ can communicate with peripheral processing devices $PPD_1$ and $PPD_2$; peripheral processing device $PPD_2$ can communicate with peripheral processing devices $PPD_1$, $PPD_2$, $PPD_3$, $PPD_4$ and $PPD_5$; and, each of peripheral processing devices $PPD_3$, $PPD_4$ and $PPD_5$, can communicate with peripheral processing devices $PPD_2$, $PPD_3$, $PPD_4$ and $PPD_5$. Similarly, peripheral processing device $PPD_6$ can communicate with peripheral processing devices $PPD_6$ and $PPD_7$; peripheral processing device $PPD_7$ can communicate with peripheral processing devices $PPD_6$ and $PPD_8$; and, peripheral processing device $PPD_8$ can communicate with peripheral processing devices $PPD_7$ and $PPD_8$.

Figures 3, 4:
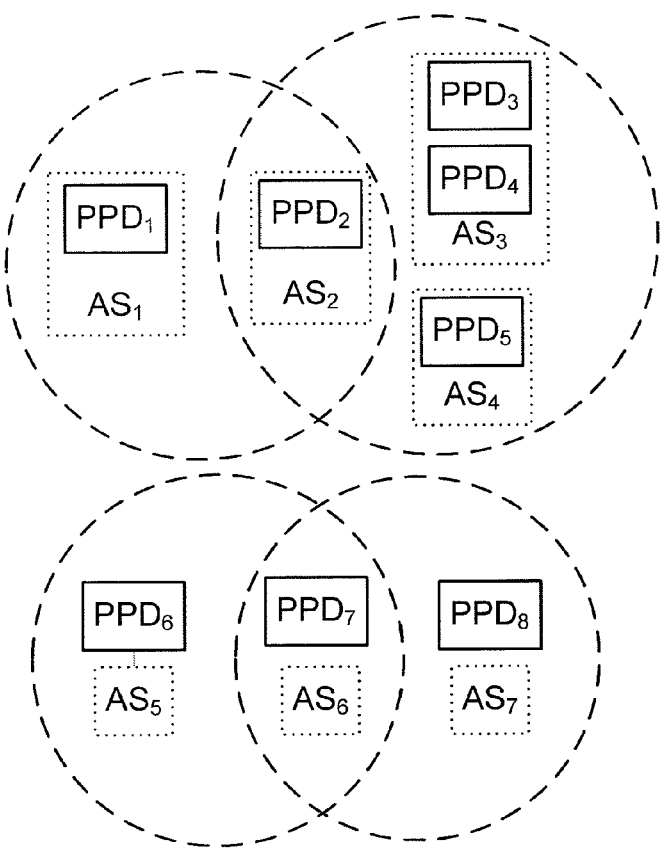
FIG. 3 is an illustrative example of access sets and access set lists that can be defined for the Fibre Channel network in FIG. 1.
FIG. 4 is a logical representation of access sets according to the definitions from the example in FIG. 3.

FIGS. 3-4 illustrate the relationships between access sets $AS_1$ through $AS_7$ that can be defined from the zones illustrated in FIG. 1 and their respective constituent peripheral processing devices $PPD_1$ through $PPD_8$. Column 310 lists access sets $AS_1$ through $AS_7$ that can be defined from the zones illustrated in FIG. 1, with the corresponding peripheral processing devices $PPD_1$ through $PPD_8$ in a given access set $AS_1$ through $AS_7$ listed in column 320 in table 300. For example, peripheral processing devices $PPD_3$ and $PPD_4$ can each communicate with $PPD_2$, $PPD_3$, $PPD_4$ and $PPD_5$ and are thus subjected to the same communications restrictions. As such, $PPD_3$ and $PPD_4$ can be placed in the same access set $AS_3$. In contrast, no other peripheral processing device shares the same communications restrictions as peripheral processing device $PPD_1$, thus peripheral processing device $PPD_1$ is identified as the sole member of access set $AS_1$.

For the zones illustrated in FIG. 1, FIG. 3 includes an example definition of six access set lists of $ASL_1$ through $ASL_6$ (see the bottom half of FIG. 3). Each access set list $ASL_1$ through $ASL_6$ (shown in column 330) is referenced by one or more access sets $AS_1$ through $AS_7$: $ASL_1$ is defined to include access sets $AS_1$ and $AS_2$, which translate to include peripheral processing devices $PPD_1$ and $PPD_2$; $ASL_2$ is defined to include access sets $AS_1$, $AS_2$, $AS_3$ and $AS_4$, which translate to include peripheral processing devices $PPD_1$, $PPD_2$, $PPD_3$, $PPD_4$ and $PPD_5$; $ASL_3$ is defined to include access sets $AS_2$, $AS_3$ and $AS_4$, which translate to include peripheral processing devices $PPD_2$, $PPD_3$, $PPD_4$ and $PPD_5$; $ASL_4$ is defined to include access sets $AS_5$ and $AS_6$, which translate to include peripheral processing devices $PPD_6$ and $PPD_7$; $ASL_5$ is defined to include access sets $AS_5$, $AS_6$ and $AS_7$, which translate to include peripheral processing devices $PPD_6$, $PPD_7$ and $PPD_8$; and, $ASL_6$ is defined to include access sets $AS_6$ and $AS_7$, which translate to include peripheral processing devices $PPD_7$ and $PPD_8$.

Table 300 further summarizes how access sets $AS_1$ through $AS_7$ (listed in column 310) reference access set lists $ASL_1$ through $ASL_6$ (listed in column 330). For example, access set $AS_2$ is listed as referencing access set list $ASL_2$, and $ASL_2$ is defined to include access sets $AS_1$, $AS_2$, $AS_3$ and $AS_4$; this means that peripheral processing device $PPD_2$ contained in access set $AS_2$ can communicate with members of access sets $AS_1$, $AS_2$, $AS_3$ and $AS_4$, i.e., peripheral processing devices $PPD_1$, $PPD_2$, $PPD_3$, $PPD_4$ and $PPD_5$. Similarly, access set $AS_1$ is listed as referencing access set list $ASL_1$; access set $AS_3$ is listed as referencing access set list $ASL_3$; access set $AS_4$ is listed as referencing access set list $ASL_3$; access set $AS_5$ is listed as referencing access set list $ASL_4$; access set $AS_6$ is listed as referencing access set list $ASL_5$; and, access set $AS_7$ is listed as referencing access set list $ASL_6$.

FIGS. 5-6 illustrate some examples of simplified, or compressed, access sets $AS_1$ through $AS_7$, and access set lists $ASL_1$ through $ASL_6$. Referring to FIG. 3, because access sets $AS_3$ and $AS_4$ each references access set list $ASL_3$, all the peripheral processing devices $PPD_3$, $PPD_4$, $PPD_5$ in access sets $AS_3$ and $AS_4$ share the same communication restrictions imposed by the zone policy, i.e., allowing communications with the members of access set list $ASL_3$. Additionally, because each of access sets $AS_1$ through $AS_7$ is defined to represent a collection of peripheral processing devices from the set of peripheral processing devices $PPD_1$ through $PPD_8$ that have the same communication restrictions imposed by the zone policy, access sets $AS_3$ and $AS_4$ can be combined into a single access set list $AS_3$ peripheral processing devices $PPD_3$, $PPD_4$ and $PPD_5$ as listed in columns 510 and 520, respectively in table 500 and illustrated in FIG. 6.

As shown in columns 310 and 330 in FIG. 3, access set $AS_1$ references access set list $ASL_1$, which is defined to include access sets $AS_1$ and $AS_2$. As such, access set list $ASL_1$ can be simplified, or compressed, by eliminating the self-referencing of access set $AS_1$. Instead, access set $AS_1$ can be translated to reference access set list $ASL_{1'}$, which is defined to include access set $AS_2$ as listed in FIG. 5. Similarly by eliminating self-referencing, columns 510 and 530 shows that access set $AS_2$ can be translated to reference access set list $ASL_{2'}$, which is defined to include access sets $AS_1$ and $AS_{3'}$; access set $AS_{3'}$, resulted from combining $AS_3$ and $AS_4$, can be translated to reference access set list $ASL_{1'}$, which is defined to include access sets $AS_2$; access set $AS_5$ can be translated to reference access set list $ASL_{4'}$, which is defined to include access set $AS_6$; access set $AS_6$ can be translated to reference access set list $ASL_{3'}$, which is defined to include access sets $AS_5$ and $AS_7$; access set $AS_7$ can be translated to reference access set list $ASL_{4'}$, which is defined to include access set $AS_6$ FIGS. 5-6 also illustrate the use of restricted access set R-$AS_5$ to simplify, or compress, access sets $AS_1$ through $AS_7$. As described above, access sets $AS_5$ and $AS_7$ each references the same access set list $ASL_{4'}$, and each only contains a single peripheral processing device $PPD_6$ and peripheral processing device $PPD_8$, respectively. In addition, peripheral processing device $PPD_6$ and $PPD_8$ are not permitted to communicate with each other under the zone policy illustrated in FIG. 1. As such, restricted access set R-$AS_5$ is defined to combine access sets $AS_5$ and $AS_7$, with the restriction that peripheral processing device $PPD_6$ and peripheral processing device $PPD_8$, as members of restricted access set R-$AS_5$, are restricted from communicating with each other. Instead, peripheral processing device $PPD_6$ and peripheral processing device $PPD_8$ can communicate with members of access set list $ASL_{4'}$ that is referenced by restricted access set R-$AS_5$.

Expressing the zone policy illustrated in FIG. 1 in terms of access sets $AS_1$, $AS_2$, $AS_{3'}$, $AS_6$, restricted access set R-$AS_5$, and access set lists $ASL_{1'}$, $ASL_{2'}$, $ASL_{3'}$, $ASL_{4'}$ as shown in FIG. 5, can facilitate the generation or updating of firewall filter rules by network management module 103. For example, members of access sets $AS_{3'}$, i.e., peripheral processing devices $PPD_3$, $PPD_4$, and $PPD_5$, can share the same firewall filter rule having a sid-list with all of the members of access set $AS_{3'}$, and a did-list having all the members of access set lists $ASL_{1'}$, i.e., peripheral processing device $PPD_2$. After the generation or updating of firewall filter rules by network management module 103, network management module 103 can enforce the firewall filter rules by sending data according to the firewall filter rules.

Figure 7:
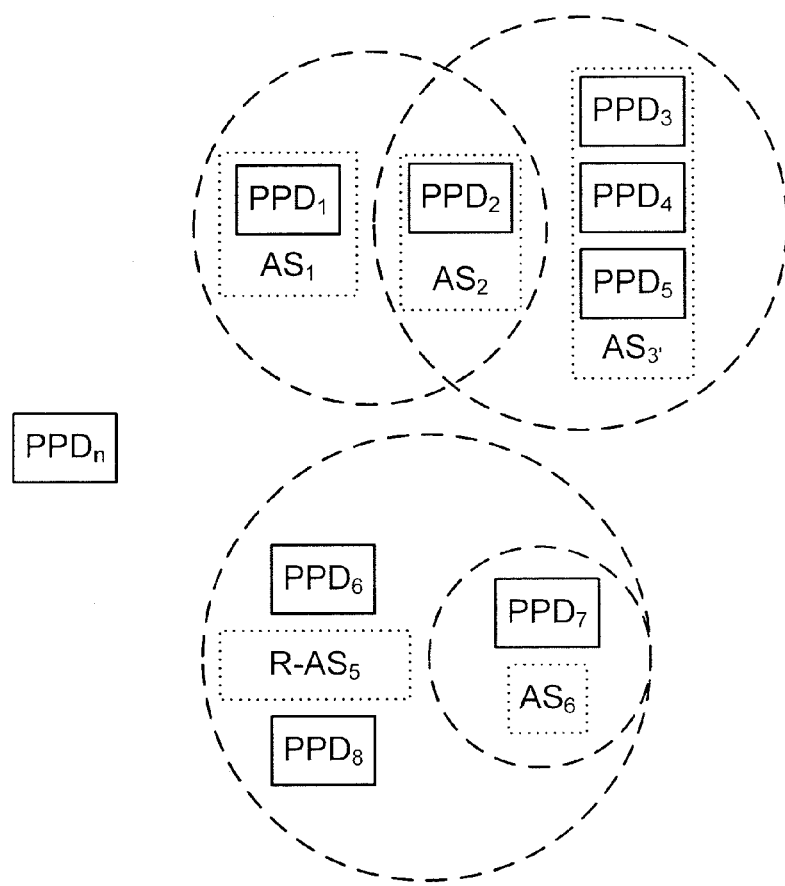
FIG. 7 is an illustration of a new peripheral processing device logging in, or entering, a network shown in FIG. 6.

FIG. 7 illustrates a scenario when a new peripheral processing device $PPD_n$, where n excludes 1 through 7, logs on to, or enters, a network. Network management module 103 can determine according to the zone policy into which access set from the set of access sets $AS_1$, $AS_2$, $AS_{3'}$, $AS_6$, and restricted access set R-$AS_5$, peripheral processing device $PPD_n$ can be placed. For example, if peripheral processing device $PPD_n$ can be placed into access sets $AS_1$, as the default zone according to the zone policy set by an administrator, then the definition of access set $AS_1$ can be updated to reflect having two members: peripheral processing devices $PPD_1$ and $PPD_n$; and because access set list $ASL_{2'}$, includes access sets $AS_1$ and $AS_{3'}$, the definition of access set list $ASL_{2'}$, can be updated to reflect having five members: peripheral processing devices $PPD_1$, $PPD_n$, $PPD_3$, $PPD_4$ and $PPD_5$. As such, network management module 103 can update the firewall filter rules involving only access set $AS_1$ and access set list $ASL_{2'}$ to reflect the addition of peripheral processing device $PPD_n$. If under the zone policy, network management module 103 cannot place peripheral processing device $PPD_n$ in access sets $AS_1$, $AS_2$, $AS_{3'}$, $AS_6$, or restricted access set R-$AS_5$, network management module 103 can place peripheral processing device $PPD_n$ in a new access set $AS_n$ (not shown in FIG. 7), define the access set list $ASL_n$ (not shown in FIG. 7) that is referenced by $AS_n$, and generate the necessary firewall filter rules accordingly.

Figure 8:
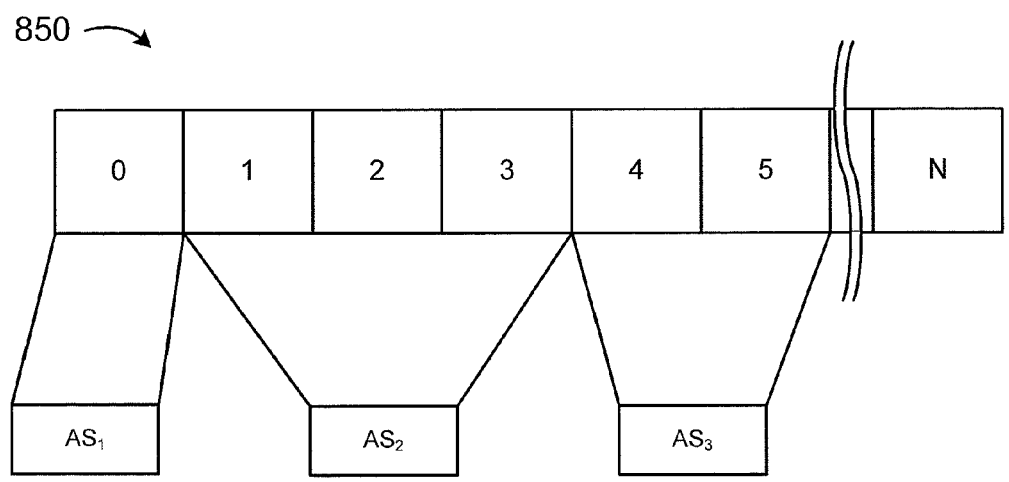
FIG. 8 is a representation of an association of network addresses and access sets and restricted access sets, according to an embodiment.

FIG. 8 is a representation of an association of network addresses and access sets and/or restricted access sets, according to an embodiment. Schema 850 illustrates a mapping of a sequence of network address (e.g., FCID) listed contiguously onto address blocks 0, 1, . . . , N. More specifically, the schema 850 illustrates a series of FCID addresses that are to be assigned to peripheral processing devices grouped together by common access sets and/or restricted access sets. FCID addresses represented by the set of address blocks 0, . . . , N can be allocated to peripheral processing devices based on which access set from the set of access sets $AS_1$, $AS_2$ and $AS_3$ the peripheral processing devices belong. In the embodiment illustrated in FIG. 8, each one of address blocks 0, . . . , N is an equally sized block, representing an equal number of FCID addresses.

The number of FCID addresses (represented by a particular number of address blocks) allocated to an access set can depend on the size of the access set. In other words, an access set with a large number of peripheral processing devices or a large expected number of peripheral processing devices can be allocated a large number of FCID addresses that are represented by a corresponding number of address blocks. Similarly, an access set with a small number of peripheral processing devices or a small expected number of peripheral processing devices can be allocated a small number of FCID addresses that are represented by a different corresponding number of address blocks. In the embodiment illustrated in FIG. 8, FCID addresses (not shown) represented by address block 0 are allocated to access set $AS_1$; FCID addresses (not shown) represented by address blocks 1, 2, and 3 are allocated to access set $AS_2$; and, FCID addresses (not shown) represented by address blocks 4 and 5 are allocated to access set $AS_3$. Because each one of address blocks 0, . . . , N is an equally sized block, access set $AS_2$, which was allocated FCID addresses represented by three address blocks, can thus contain more peripheral processing devices than access set $AS_3$, which was allocated FCID addresses represented by two address blocks. Similarly, access set $AS_3$ can contain more peripheral processing devices than access set $AS_1$, which was allocated FCID addresses represented by one address block.

In some embodiments, address blocks 0, ..., N can be identified by using prefix aggregation. Prefix aggregation identifies a block of addresses where a specified number of initial bits match. For example, in one embodiment of Fibre Channel protocol using 24-binary-bit FCID addresses having the format of dd.aa.pp, where dd represents an 8-binary-bit Domain ID, aa represents an 8-binary-bit Area ID, and pp represents an 8-binary-bit Port ID, D1.A1.P1/23 would represent a block of two FCID addresses where the initial 23 binary bits match D1.A1.P1, where D1, A1, P1 are examples of a specific Domain ID, a specific Area ID and a specific Port ID, respectively. Similarly, D1.A1.P1/22 would represent a block of four FCID addresses where the initial 22 binary bits match D1.A1.P1.

Using an illustrative numerical example, assume schema 850 represents onto 24-binary-bit FCID addresses starting at D1.A1.00000000 where D1 and A1 represent a specific Domain ID and a specific Area ID, respectively of a network, and 00000000 is the binary address of a port on the network and each one of address blocks 0, ..., N maps onto four FCID addresses. Address block 0 can thus be identified by D1.A1.00000000/22 to provide a block of four FCID addresses: D1.A1.00000000, D1.A1.00000001, D1.A1.00000010, and D1.A1.00000011. Because access set $AS_1$ was allocated address block 0, a firewall filter rule referring to access set $AS_1$ in the sid-list can instead refer to D1.A1.00000000/22 in the sid-list. Similarly, address blocks 1, 2, and 3 can be identified by D1.A1.00000100/22, D1.A1.00001000/22, and D1.A1.00001100/22, respectively. Because access set $AS_2$ was allocated address blocks 1, 2, and 3, a firewall filter rule referring to access set $AS_2$ in the sid-list can instead refer to D1.A1.00000100/22, D1.A1.00001000/22, and D1.A1.00001100/22 in the sid-list.

In use, when a first peripheral processing device logs into a Fibre Channel network, a network management module can determine according to the zone policy to which access set the first peripheral processing device should be assigned. For example, if the first peripheral processing device is the first member to be assigned to access set $AS_1$, and continuing to use the numerical example above, the network management module can first allocate to access set $AS_1$ FCID addresses represented by address block 0, which can identified by D1.A1.00000000/22 to provide a block of four FCID addresses. The network management module can then assign the first peripheral processing device with the address of D1.A1.00000000, and leaving three FCID addresses represented by block 0 unused. Thereafter, the network management module can generate or update a firewall filter rule to accommodate the presence of access set $AS_1$ by referring to the FCID prefix for the FCID addresses that are represented by block 0 in the sid-list, i.e., D1.A1.00000000/22.

Additionally, if a second peripheral processing device logs into the Fibre Channel network and pursuant to the zone policy, the network management module assigns the second peripheral processing device to access set $AS_1$ where the firewall filter rule for access set $AS_1$ is already present, then the restrictions on the second peripheral processing is encompassed by the firewall filter rule that refers to the FCID prefix for the FCID addresses that are represented by block 0 in the sid-list, i.e., D1.A1.00000000/22. As such, the generation or update of firewall filter rules is not necessary to accommodate the login of the second peripheral processing device assigned to access set $AS_1$. In this manner, because multiple communication patterns of peripheral processing devices can be represented using a single rule referring to a single FCID address prefix, the size of sid-list in the firewall filter rules can be reduced as compared to some known TCAM-based implementations. In addition, the disruption caused by login or logout events of peripheral processing devices from a Fibre Channel network can be reduced.

Where a network management module initially allocated four FCID addresses represented by address block 1 to access set $AS_2$, for example, if additional peripheral processing devices were subsequently assigned to access set $AS_2$ such that the number of peripheral processing devices in access set $AS_2$ exceeds four FCIDs, then the network management module can regenerate the entire set of firewall filter rules for the network to allocate additional address block 2 and/or address block 3 to access set $AS_2$, which can include the reassignment of FCID addresses to other peripheral processing devices that had previous assignments of FCID addresses. For example, the peripheral processing devices in access set $AS_3$, which may have previously been assigned FCID addresses represented by address blocks 2 and 3, can be reassigned to FCID addresses that are represented by address blocks 4 and 5 to accommodate the additional peripheral processing devices in access set $AS_2$.

Although FIG. 8 shows access set $AS_2$ as being allocated consecutive FCID addresses represented by address blocks 1, 2, and 3, a network management module is not limited to allocating consecutive FCID addresses to a single access set. For example, if after applying the access set compression as described in connection with FIGS. 5-6, access sets $AS_1$ and $AS_3$ in FIG. 8 can be compressed into access set $AS_1$ (not shown in FIG. 8), the network management module can regenerate the entire set of firewall filter rules for the network and reassign FCID addresses to provide consecutive FCID addresses allocated to each access set as similar to the descriptions above. Alternatively, the network management module can maintain the allocation of non-consecutive blocks of FCID addresses to access set $AS_1$, and then generate or update a firewall filter rule for access set $AS_1$, by referring to the three prefixes for FCID addresses mapping on to blocks 0, 4 and 5.

In addition, although FIG. 8 illustrates each one of address blocks 0, ..., N using equally sized blocks (representing an equal number of network addresses), a network management module can allocate FCID addresses of different prefix lengths to be represented by each address block. For example, for 24-bit FCID addresses, FCID addresses with 22-bit prefix length can be represented by address block 4, resulting in four allocated FCID addresses. In contrast, FCID addresses with 21-bit prefix length can be represented by address block 5, resulting in eight allocated FCID addresses. In some embodiments, a network management module can analyze the zone policy in choosing the prefix length of FCID addresses to allocate to an access set, thereby varying the number of FCID addresses represented by each address block FIG. 9 is a system block diagram of a switch fabric system according to another embodiment. The switch fabric system 900 includes a switch fabric 902, a network management module 950, and multiple access switches 982, 984, 986. The switch fabric 902 can be any suitable switch fabric that operatively couples the access switches 982, 984, 986 to the other access switches 982, 984, 986. In some embodiments, for example, the switch fabric 902 can be a Clos network (e.g., a non-blocking Clos network, a strict sense non-blocking Clos network, a Benes network) having multiple stages of switching modules (e.g., integrated Ethernet switches). In some embodiments, for example, the switch fabric 902 can be similar to the three-stage switch fabric 1000 shown in FIG. 10 and described in further detail herein. In other embodiments, the switch fabric 902 shown in FIG. 9 can include any number of stages, for example, five, seven or nine stages. The switch fabric 902 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 902 can be (e.g., can function as) a single consolidated switch (e.g., a single large-scale consolidated L2/L3 switch). In other words, the switch fabric 902 can be configured to operate as a single logical entity (e.g., a single logical network element). The switch fabric 902 can be configured to connect (e.g., facilitate communication between) the peripheral processing devices 914, 924, 934. In some embodiments, the switch fabric 902 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds. Although the switch fabric 902 can be logically centralized, the implementation of the switch fabric 902 can be highly distributed, for example, for reliability. For example, portions of the switch fabric 902 can be physically distributed across, for example, many chassis. In some embodiments, for example, a processing stage of the switch fabric 902 can be included in a first chassis and another processing stage of the switch fabric 902 can be included in a second chassis. More details related to architecture of the switch fabric 902 are described herein.

As described in further detail herein, each access switch 982, 984, 986 can be any device that operatively couples peripheral processing devices 914, 924, 934 to switch fabric system 900. In some embodiments, for example, the access switches 982, 984, 986 can be edge devices, input/output modules, top-of-rack devices and/or the like. Structurally, the access switches 982, 984, 986 can function as both source access switches and destination access switches. Accordingly, the access switches 982, 984, 986 can send data (e.g., a data stream of data packets and/or data cells) to and receive data from the switch fabric system 900, and to and from the connected peripheral processing devices 914, 924, 934.

In use, a data packet (e.g., an Ethernet packet) can be sent between peripheral processing devices 914, 924, 934 via the switch fabric system 900. For example, a data packet can be sent from a first peripheral processing device 924' to a second peripheral processing device 934' via path 996. The first peripheral processing device 924' can send the data packet to the access switch 984 via link 992 using a first protocol (e.g., Ethernet). The access switch 984 can then prepare the data packet to enter the switch fabric 902 (e.g., based on a second protocol). Additional details related to data transmission using a switch fabric are described in U.S. patent application Ser. No. 12/343,728 entitled "Methods and Apparatus for Transmission of Groups of Cells via a Switch Fabric" filed Dec. 24, 2008 is incorporated herein by reference in its entirety. Once prepared, the access switch 984 sends the data packet to the switch fabric 902 via link 993. The switching modules within the switch fabric 902 can route the data packets through the switch fabric 902 according to the second protocol. The data packet is sent through port 998 to the access switch 986 via link 994. The access switch 986 can then send the data packet to the second peripheral processing device 934' via link 995 using the first protocol.

FIG. 10 is a schematic illustration of a switch fabric 1000, according to an embodiment. Switch fabric 1000 is a three-stage, non-blocking Clos network and includes a first stage 1040, a second stage 1042, and a third stage 1044. The first stage 1040 includes modules 1012. Each module 1012 of the first stage 1040 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 1012 of the first stage 1040 is a switch (e.g., a packet switch, a frame switch, an integrated Ethernet switch and/or a cell switch). The switches are configured to redirect data (e.g., data packets, data cells, etc.) as it flows through the switch fabric 1000. Each module 1012 of the first stage 1040 includes a set of input ports 1060 configured to receive data (e.g., a signal, a cell of a packet, a data packet, etc.) as it enters the switch fabric 1000. In this embodiment, each module 1012 of the first stage 1040 includes the same number of input ports 1060. In some embodiments of module 1012, for example, input ports 1060 is operatively coupled to write interfaces on a memory buffer (not shown in FIG. 10). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Similar to the first stage 1040, the second stage 1042 of the switch fabric 1000 includes modules 1014. Modules 1014 of the second stage 1042 are structurally similar to modules 1012 of the first stage 1040. Each module 1014 of the second stage 1042 is operatively coupled to each module 1012 of the first stage 1040 by a data path 1020. Each data path 1020 between a given module 1012 of the first stage 1040 and a given module 1014 of the second stage 1042 is configured to facilitate data transfer from a module 1012 of the first stage 1040 to a module 1014 of the second stage 1042.

The data paths 1020 between the modules 1012 of the first stage 1040 and the modules 1014 of the second stage 1042 can be constructed in any manner configured to facilitate data transfer from the modules 1012 of the first stage 1040 to the modules 1014 of the second stage 1042. In some embodiments, for example, the data paths 1020 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 1000 is a non-blocking Clos network. Thus, the number of modules 1014 of the second stage 1042 of the switch fabric 1000 varies based on the number of input ports 1060 of each module 1012 of the first stage 1040. In a rearrangeably non-blocking Clos network (e.g., a Benes network), the number of modules 1014 of the second stage 1042 is greater than or equal to the number of input ports 1060 of each module 1012 of the first stage 1040. Thus, if n is the number of input ports 1060 of each module 1012 of the first stage 1040 and m is the number of modules 1014 of the second stage 1042, m≧n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 1044 of the switch fabric 1000 includes modules 1016. The modules 1016 of the third stage 1044 are structurally similar to the modules 1012 of the first stage 1040. The number of modules 1016 of the third stage 1044 is typically equivalent to the number of modules 1012 of the first stage 1040. Each module 1016 of the third stage 1044 includes output ports 1062 configured to allow data to exit the switch fabric 1000. Each module 1016 of the third stage 1044 includes the same number of output ports 1062. Further, the number of output ports 1062 of each module 1016 of the third stage 1044 is typically equivalent to the number of input ports 1060 of each module 1012 of the first stage 1040.

Each module 1016 of the third stage 1044 is connected to each module 1014 of the second stage 1042 by a data path 1024. The data paths 1024 between the modules 1014 of the second stage 1042 and the modules 1016 of the third stage 1044 are configured to facilitate data transfer from the modules 1014 of the second stage 1042 to the modules 1016 of the third stage 1044. The data paths 1024 between the modules 1014 of the second stage 1042 and the modules 1016 of the third stage 1044 can be constructed in any manner configured to facilitate data transfer from the modules 1014 of the second stage 1042 to the modules 1016 of the third stage 1044. In some embodiments, for example, the data paths 1024 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

Figure 11:
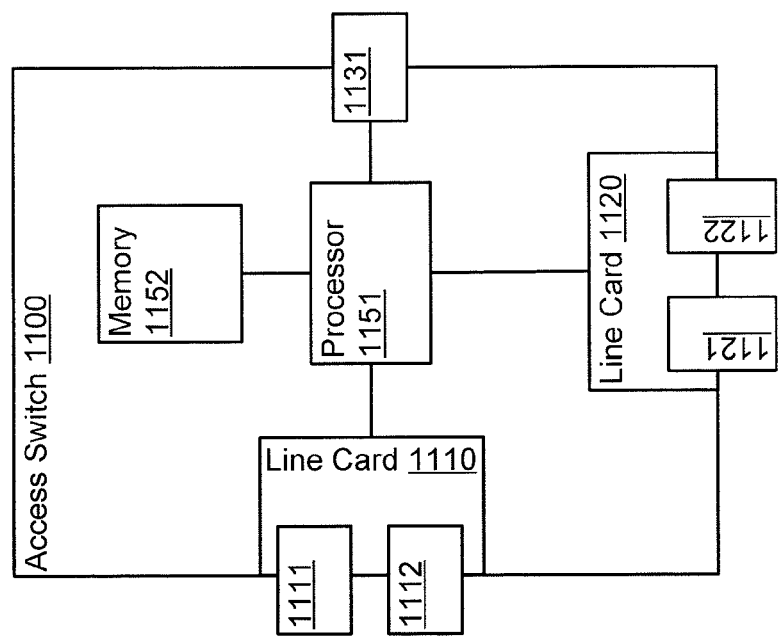
FIG. 11 is a system block diagram of an access switch of a switch fabric system, according to another embodiment.

FIG. 11 is a system block diagram of an access switch 1100 similar to the access switches 982, 984, 986. The access switch 1100 includes processor 1151, memory 1152, line card 1110, line card 1120, and port 1131. Processor 1151 is operatively coupled to memory 1152, line card 1110, line card 1120 and port 1131. In some embodiments, the instructions that implement a network management module (not shown in FIG. 11) can be stored at memory 1152 and executed at processor 1151. Line card 1110 includes ports 1111 and 1112. Line card 1120 includes ports 1121 and 1122. In some embodiments, line cards 1110 and/or 1120 include one or more processors and/or memories.

Ports 1111, 1112, 1121 and 1122 can communicate with peripheral processing devices 914, 924, 934. For example, ports 1111, 1112, 1121 and 1122 can implement a physical layer using twisted-pair electrical signaling via electrical cables or fiber-optic signaling via fiber-optic cables. In some embodiments, some of ports 1111, 1112, 1121 and 1122 implement one physical layer such as twisted-pair electrical signaling and others of ports 1111, 1112, 1121 and 1122 implement a different physical layer such as fiber-optic signaling. Furthermore, ports 1111, 1112, 1121 and 1122 can allow access switch 1100 to communicate with peripheral processing devices, such as, for example, computer servers (servers), via a common protocol such as Ethernet or Fibre Channel. In some embodiments, some of ports 1111, 1112, 1121 and 1122 implement one protocol such as Ethernet and others of ports 1111, 1112, 1121 and 1122 implement a different protocol such as Fibre Channel. Thus, access switch 1100 can be in communication with multiple peripheral processing devices using homogeneous or heterogeneous physical layers and/or protocols via ports 1111, 1112, 1121 and 1122.

Port 1131 can be in communication with other access switches via a communications network such as a switch fabric (e.g., data plane portion of communications network 110). Port 1131 can be part of one or more network interfaces (e.g., a 40 Gigabit (Gb) Ethernet interface, a 100 Gb Ethernet interface, etc.) through which the access switch 1100 can send signals to and/or receive signals from a communications network. The signals can be sent to and/or received from the communications network via an electrical link, an optical link and/or a wireless link operatively coupled to the access switch 1100. In some embodiments, the access switch 1100 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 1131 can implement a different physical layer and/or protocol than those implemented at ports 1111, 1112, 1121 and 1122. For example, port 1111, 1112, 1121 and 1122 can communicate with peripheral processing devices using a protocol based on data packets and port 1131 can communicate via a switch fabric using a protocol based on data cells. Said differently, access switch 1100 can be an edge device of a network switch such as a distributed network switch.

In some embodiments, the access switch 1100 can prepare a data packet (e.g., an Ethernet packet) to enter a communications network (e.g., communications network 110). For example, the access switch 1100 can forward, classify, and/or modify the packet encapsulation (e.g., modify, add and/or remove a header portion, footer portion and/or any other identifier included within the data packet) of a data packet prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

FIG. 12 is a system block diagram of a compute device 1200, according to an embodiment. Compute device 1200 includes processor 1210, memory 1220, and communications interface 1230. Processor 1210 is operatively coupled to memory 1220 and communications interface 1230. Compute device 1200 can communicate with other compute devices, peripheral processing devices and/or access switches via communications interface 1230. In some embodiments compute device 1200 can be hosted inside one or more access switches 982, 984, 986.

In some embodiments, instructions that implement network management module 1224 can be stored at memory 1220 and executed at processor 1210. In some embodiments, the network management module 1224 (similar to network management module 950 of FIG. 9) can store in memory 1220 a configuration file associated with configuration information (e.g., port protocol information, network segment assignment information, port assignment information, peripheral processing device information, zone policies, access sets, access set lists etc.) and/or forwarding-state information (e.g., routing information, port identifiers, network segment identifiers, peripheral processing device identifiers etc.) associated with the switch fabric system 900.

In some embodiments, instructions that implement network management module 1224 can include instructions to retrieve zone assignments for the network such as the zone assignments represented in FIG. 1. In addition, instructions that implement network management module 1224 can define, or associate, peripheral processing devices 914, 924, 934 with access sets and access set lists, and further define, or associate, each access set with its referenced access set list, such that a peripheral processing devices 914, 924, 934 in an access set can communicate with all of the members of the access set list referenced by the access set. The instructions that implement network management module 1224 can also include instructions to simplify, or compress, access sets and access set lists. Based on the definitions of access sets and access set lists, the instructions that implement network management module 1224 can generate or update firewall filter rules and enforce the firewall filter rules by sending data according to the firewall filter rules as discussed above in connection with FIGS. 1-7.

In some embodiments, the instructions that implement network management module 1224 can allocate network addresses mapping onto address blocks to access sets, such that the peripheral processing devices in a common access set share a common address prefix. Thus, the firewall filter rule for such a common access set can be expressed by using a common address prefix.

In some embodiments, compute device 1200 can be dedicated to hosting network management module 1224. In other words, compute device 1200 can allocate all or substantially all of its computing resources (e.g., processing capacity and memory) to network management module 1224.

Figure 13:
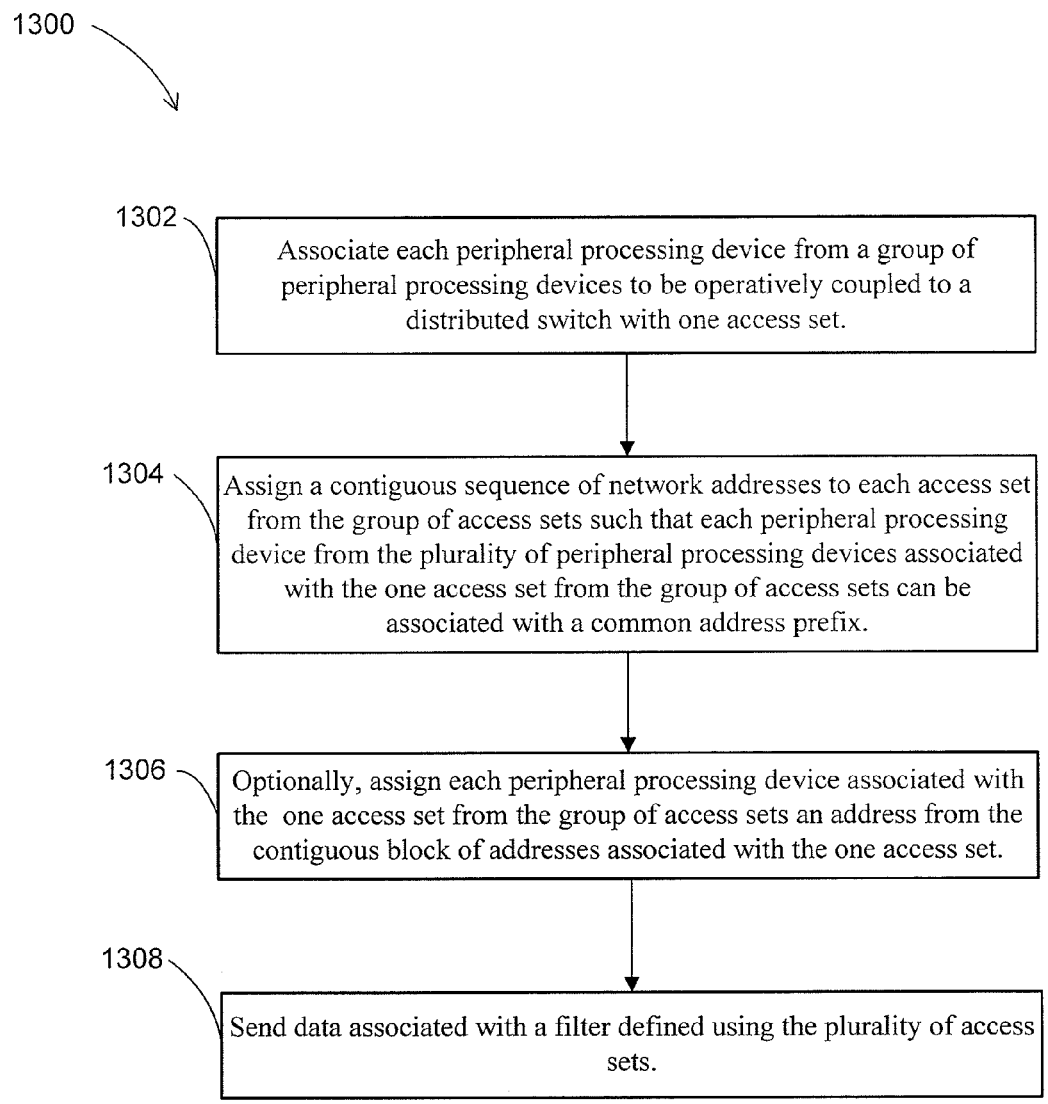
FIG. 13 is a flow chart illustrating a method of generating or updating firewall filter rules through the use of access sets, restricted access and access set lists.

FIG. 13 is a flow chart illustrating a method 1300 of generating or updating firewall filter rules through the use address prefixes. The method 1300 includes at 1302, associating each peripheral processing device from a group of peripheral processing devices to be operatively coupled to a distributed switch with one access set. Each peripheral processing device in an access set is operable to send data to a common set of peripheral processing devices from the group of peripheral processing devices. Accordingly, as discussed above, since peripheral processing devices in each access set are operable to send data to a common set of peripheral processing devices from the group of peripheral processing devices, the peripheral processing devices in each access set can share the same firewall filter rule.

At 1304, a contiguous sequence of network addresses is assigned to each access set from the group of access sets such that each peripheral processing device from the group of peripheral processing devices associated with the one access set from the group of access sets can be associated with a common address prefix. As such the firewall filter rule for the one access set can be expressed in terms of one or more common address prefixes.

At 1306, each peripheral processing device associated with the one access set from the group of access sets is optionally assigned an address from the contiguous sequence of network addresses associated with the one access set. As discussed above, if the one access set already has an associated firewall filter rule active in the network, a peripheral processing device added to the network and receiving an address assignment from the block of addresses associated with the one access set, would not require the generation or update of a separate firewall filter rule.

At 1308, data associated with a firewall filter rule defined using the group of access sets is sent across a network. As discussed above, the firewall filter rules can be expressed in terms of address prefixes.

Although the discussion herein refers to some network embodiments implemented using the Fibre Channel protocol, a person skilled in the art would readily appreciate that embodiments implemented under other networking standards or protocols, including but not limited to Ethernet or InfiniBand.

The foregoing discussions assumed embodiments where the policy restriction is to block all communication traffic moving between zones while allowing all communication traffic within a zone. A person skilled in the art would readily appreciate that other embodiments with different policy restrictions between zones are possible. Other examples of policies may include forwarding, masking, encryption and decryption, authentication, prioritization, scheduling, filtering, and monitoring of traffic attempting to cross from one zone to another.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments an access switch and a peripheral processing device in a switch fabric can be included in a single hardware device or module.

What is claimed is:

1. An apparatus, comprising:
a network management module, implemented in at least one of hardware or a non-transitory processor-readable medium, to associate each peripheral processing device from a plurality of peripheral processing devices, based on a zone assignment associated with that peripheral processing device, to be operatively coupled to a distributed switch with one access set from a plurality of access sets such that (1) the one access set is disjointed from the remaining access sets, (2) each peripheral processing device from the plurality of peripheral processing devices is prohibited from being associated with more than the one access set, and (3) each access set from the plurality of access sets is to include a first set of peripheral processing devices from the plurality of peripheral processing devices each of which is operable to send data to each peripheral processing device from a second set of peripheral processing devices from the plurality of peripheral processing devices via the distributed switch, the network management module to assign a contiguous block of addresses to each access set from the plurality of access sets such that each peripheral processing device from the plurality of peripheral processing devices included within an access set from the plurality of access sets is associated with a common address prefix, the network management module to send data associated with a filter defined using the common address prefix.

2. The apparatus of claim 1, wherein the network management module is to assign each peripheral processing device within the access set from the plurality of access sets an address from the contiguous block of addresses associated with the access set.

3. The apparatus of claim 1, wherein filter is associated with each peripheral processing device within the access set from the plurality of access sets.

4. The apparatus of claim 1, wherein a length of the common address prefix is based on a quantity of peripheral processing devices within the access set from the plurality of access sets.

5. The apparatus of claim 1, wherein the network management module is to associate a peripheral processing device from the plurality of peripheral processing devices with an access set from the plurality of access sets based on a policy associated with that peripheral processing device.

6. The apparatus of claim 1, wherein the network management module is to associate a peripheral processing device from the plurality of peripheral processing devices with an access set from the plurality of access sets based on a Fibre Channel zone assignment associated with that peripheral processing device.

7. The apparatus of claim 1, wherein the contiguous block of addresses assigned to the access set from the plurality of access sets includes a quantity of addresses greater than a quantity of peripheral processing devices within the access set.

8. The apparatus of claim 1, wherein the network management module is to assign each peripheral processing device within an access set from the plurality of access sets a Fibre Channel identifier having an address from the contiguous block of addresses associated with that access set.

9. The apparatus of claim 1, wherein the distributed switch includes a switch fabric and a plurality of access switches.

10. A non-transitory processor-readable medium storing code representing instructions to cause a processor to:
associate each peripheral processing device from a plurality of peripheral processing devices based on a zone assignment associated with that peripheral processing device, to be operatively coupled to a distributed switch with one access set from a plurality of access sets such that (1) the one access set is disjointed from the remaining access sets, (2) each peripheral processing device from the plurality of peripheral processing devices is prohibited from being associated with more than the one access set, and (3) each peripheral processing device is operable to send data to a common set of peripheral processing devices from the plurality of peripheral processing devices;
assign a contiguous block of addresses to each access set from the plurality of access sets such that each peripheral processing device from the plurality of peripheral processing devices associated with the one access set from the plurality of access sets is associated with a common address prefix; and
send data associated with a firewall filter rule defined using the plurality of access sets.

11. The non-transitory processor-readable medium of claim 10, the code further comprising code representing instructions to cause the processor to:
assign each peripheral processing device associated with the one access set from the plurality of access sets an address from the contiguous block of addresses associated with the one access set.

12. The non-transitory processor-readable medium of claim 10, wherein the filter is identified, at least in part, by the common address prefix.

13. The non-transitory processor-readable medium of claim 10, wherein a length of the common address prefix for each peripheral processing device from the plurality of peripheral processing devices associated with the one access set from the plurality of access sets is based on a quantity of peripheral processing devices associated with the one access set from the plurality of access set.

14. The non-transitory processor-readable medium of claim 10, wherein the contiguous block of addresses assigned to the one access set from the plurality of access sets includes a quantity of addresses greater than a quantity of peripheral processing devices associated with the one access set.

15. The non-transitory processor-readable medium of claim 10, wherein the code representing instructions to cause the processor to associate each peripheral processing device includes code representing instructions to cause the processor to associate each peripheral processing device from the plurality of peripheral processing devices with one access set from the plurality of access sets based on a Fibre Channel zone assignment associated with that peripheral processing device from the plurality of peripheral processing devices.

16. An apparatus, comprising:
a network management module, implemented in at least one of hardware or a non-transitory processor-readable medium, to associate each peripheral processing device from a plurality of peripheral processing devices based on a zone assignment associated with that peripheral processing device, to be operatively coupled to a distributed switch with one access set from a plurality of access sets such that (1) the one access set is disjointed from the remaining access sets, (2) each peripheral processing device from the plurality of peripheral processing devices is prohibited from being associated with more than the one access set, and (3) a peripheral processing device from the plurality of peripheral processing devices is to be associated with a common access set from the plurality of access sets as the remaining peripheral processing devices from the plurality of peripheral processing devices that are operable to send data to a common set of peripheral processing devices from the plurality of peripheral processing devices as the peripheral processing device, the network management module to assign a quantity of blocks of addresses to an access set from the plurality of access sets, the network management module to assign the quantity of blocks of addresses based on a quantity of peripheral processing devices associated with the access set from the plurality of access sets, the network management module to send data associated with at least one filter defined using an address associated with at least one block of addresses from the blocks of addresses.

17. The apparatus of claim 16, wherein the network management module is to assign the quantity of blocks of address to the access set from the plurality of access sets such that each peripheral processing device associated with the access set from the plurality of access sets has a common address prefix.

18. The apparatus of claim 16, wherein the network management module is to assign an address from a block of address assigned to the access set from the plurality of access sets to a peripheral processing device associated with the access set.

19. The apparatus of claim 16, wherein the quantity of blocks of addresses is a first quantity of blocks of addresses, the access set from the plurality of access sets is a first access set from the plurality of access sets, the network management module to assign a second quantity of blocks of addresses to a second access set from the plurality of access sets, the second quantity of blocks of addresses is greater than the first quantity of blocks of addresses, the second access set is associated with a second quantity of peripheral processing devices greater than the first quantity of peripheral processing devices.

20. The apparatus of claim 16, wherein each block of addresses from the blocks of addresses has a same quantity of addresses.

* * * * *